United States Patent [19]

Carver et al.

[11] Patent Number: 5,154,629
[45] Date of Patent: Oct. 13, 1992

[54] ENERGY TRANSMISSION CABLE CONNECTOR WITH LATCHING MECHANISM

[75] Inventors: Keith R. Carver, Alameda; J. Scott Ellis, Saratoga, both of Calif.

[73] Assignee: Icontec, Inc., Milpitas, Calif.

[21] Appl. No.: 860,227

[22] Filed: Mar. 27, 1992

Related U.S. Application Data

[63] Continuation of Ser. No. 754,203, Aug. 23, 1991, abandoned, which is a continuation of Ser. No. 564,169, Aug. 8, 1990, abandoned.

[51] Int. Cl.⁵ .......................................... H01R 13/627
[52] U.S. Cl. .................................... 439/352; 439/358; 439/372; 439/607
[58] Field of Search .............................. 439/350–354, 439/356, 357, 358, 345, 347, 372, 607, 610

[56] References Cited

U.S. PATENT DOCUMENTS

| | | | |
|---|---|---|---|
| 3,475,718 | 10/1969 | Hartz et al. | 439/357 |
| 3,523,269 | 8/1970 | Witek, Jr. et al. | 439/358 |
| 3,718,887 | 2/1973 | Solomon et al. | 27/73 |
| 3,744,128 | 7/1973 | Fisher et al. | 29/629 |
| 3,828,302 | 8/1974 | Cieniawa et al. | 439/357 |
| 3,871,732 | 3/1975 | Appleton | 439/356 |
| 3,926,497 | 12/1975 | Eigenbrode | 439/353 |
| 4,008,941 | 2/1977 | Smith | 439/358 |
| 4,105,275 | 8/1978 | Dixon et al. | 439/358 |
| 4,109,989 | 8/1978 | Snyder, Jr. et al. | 439/357 |
| 4,188,086 | 2/1980 | Inouye et al. | 439/358 |
| 4,405,192 | 9/1983 | Eaby et al. | 439/357 |
| 4,437,725 | 3/1984 | Eaby et al. | 439/357 |
| 4,597,624 | 7/1986 | Lax et al. | 339/143 R |
| 4,641,902 | 2/1987 | Fusselman | 439/350 |
| 4,702,542 | 10/1987 | Noyes | 439/347 |
| 4,726,783 | 2/1988 | Nakazawa et al. | 439/350 |
| 4,787,860 | 11/1988 | Bender | 439/358 |
| 4,842,542 | 6/1989 | Davis | 439/357 |
| 4,873,614 | 10/1989 | Lichtensperger | 439/358 |
| 4,961,711 | 10/1990 | Fujiura et al. | 439/357 |
| 5,011,424 | 4/1991 | Simmons | 439/352 |

OTHER PUBLICATIONS

"Shielded Amplimite .050 Series Connectors", 2 pages, AMP Incorporated, 1988.
Honda Connectors '88 by Honda Tsushin Kogyo Co., Ltd., 15 pages.

Primary Examiner—Larry I. Schwartz
Assistant Examiner—J. R. Daulton
Attorney, Agent, or Firm—Roylance, Abrams, Berdo & Goodman

[57] ABSTRACT

An energy transmission cable connector for connecting terminals in a circuit has a cable coupled to a connector housing which is enclosed by a molded outer housing. The outer housing has a pair of side cavities pivotally receiving a pair of latches. The latches have locking fingers for engaging a connecting element and are biased into a locking position by integral leaf springs or helical compression springs. The pivotal coupling of the latches is accomplished by protrusions on the latches retained by recesses in the housing, a pin assembly, or an integrally molded hinge. The connector can be used with electrical or fiber optic cables.

37 Claims, 4 Drawing Sheets

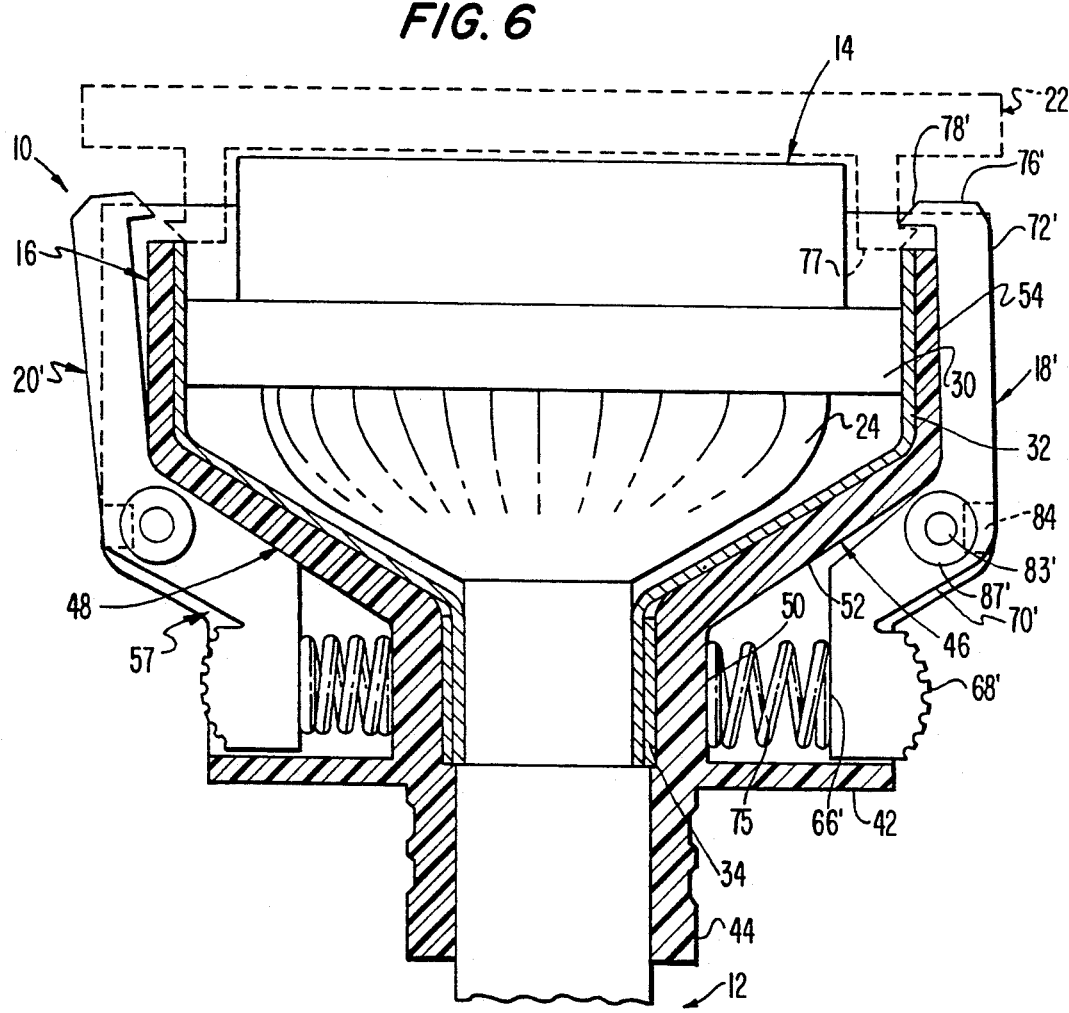

ENERGY TRANSMISSION CABLE CONNECTOR WITH LATCHING MECHANISM

This is a continuation of application Ser. No. 07,754,203 filed Aug. 23, 1991, abandoned, which is a continuation of Ser. No. 07,564,169, filed Aug. 8, 1990, abandoned.

FIELD OF THE INVENTION

The invention relates to an energy transmission cable connector having pivotal latching mechanisms for connecting and releasably locking the connector to another device. The connector can be used with electrical or fiber optic cables.

BACKGROUND OF THE INVENTION

Electrical cables typically have end terminals retained in a connector housing for attaching to a complementary connector housing having mating terminals to complete an electric circuit. Coaxial cable demands a larger interface surface than a simple cord and plug, for example, because of the higher density of terminals.

In the past, high density connectors have been joined by separate mechanical fasteners such as screws, hinged loops, or clamping arms which may not provide a secure and reliable contact if the fasteners are loose or misaligned. Separate mechanical fasteners require more time to assemble and add pieces of hardware which may be tampered with or lost. Also, the appearance of the housing is unsightly due to the extra hardware.

Resilient or pivotal latches have been used to overcome the disadvantages of the above-mentioned mechanical fasteners. However, the fasteners shown in the prior art do not have a means for resisting unlatching other than the pivot joint itself. Thus, each time the latch is connected and disconnected, the pivot point or hinge undergoes additional stresses thereby weakening or deforming the joint. Latches which protrude from the sides of the housing must have enough room to allow for the pivotal movement which exposes the latch to the possibility of being broken.

Examples of these prior art devices are disclosed in the following U.S. Pat. Nos.: 3,475,718 to Hartz et al; 3,523,269 to Witek, Jr. et al; 3,718,887 to Solomon et al; 3,744,128 to Fisher et al; 3,828,302 to Cieniawa et al; 3,926,497 to Eigenbrode; 4,008,941 to Smith; 4,105,275 to Dixon et al; 4,109,989 to Snyder, Jr. et al; 4,188,086 to Inouye et al; 4,405,192 to Eaby et al; 4,437,725 to Eaby et al; 4,597,624 to Lax et al; 4,641,902 to Fusselman; and 4,787,860 to Bender, the disclosures of which are hereby incorporated herein by reference.

SUMMARY OF THE INVENTION

Accordingly, a primary object of the invention is to provide an inexpensive, yet effective, electrical or fiber optic cable connector with a latching mechanism that provides a reliable contact and secure interlock.

Another object of the invention is to provide an electrical or fiber optic cable connector with a latching mechanism that does not require additional hardware and that is aesthetically pleasing.

Another object is to provide an electrical or fiber optic cable connector with a latching mechanism that is essentially tamper-proof and is very durable by spacing the pivot axis of the latching mechanism from the biasing force tending to keep the mechanism closed.

Another object is to provide a latching mechanism that is more cost effective because of faster assembly and substantially less material costs.

The foregoing objects are attained by providing a connector comprising an energy transmission cable coupled to a connector housing, an outer housing enclosing the connector housing and coupled to the energy transmission cable, a pair of latches, a first mechanism coupled to the latches and the outer housing for pivoting the latches between open and closed positions, and a second mechanism coupled to the latches and the outer housing for resisting movement of the latches from the closed to the open position, the first mechanism being spaced from the second mechanism.

Other objects, advantages and salient features of the invention will become apparent from the following detailed description, which, taken in conjunction with the annexed drawings, discloses preferred embodiments of the invention.

DRAWINGS

Referring now to the drawings which form a part of this original disclosure:

FIG. 6 is a top plan view of the cable, connector housing and housing in longitudinal section showing a modified latch in closed and open positions.

DETAILED DESCRIPTION OF THE INVENTION

Figure 1:
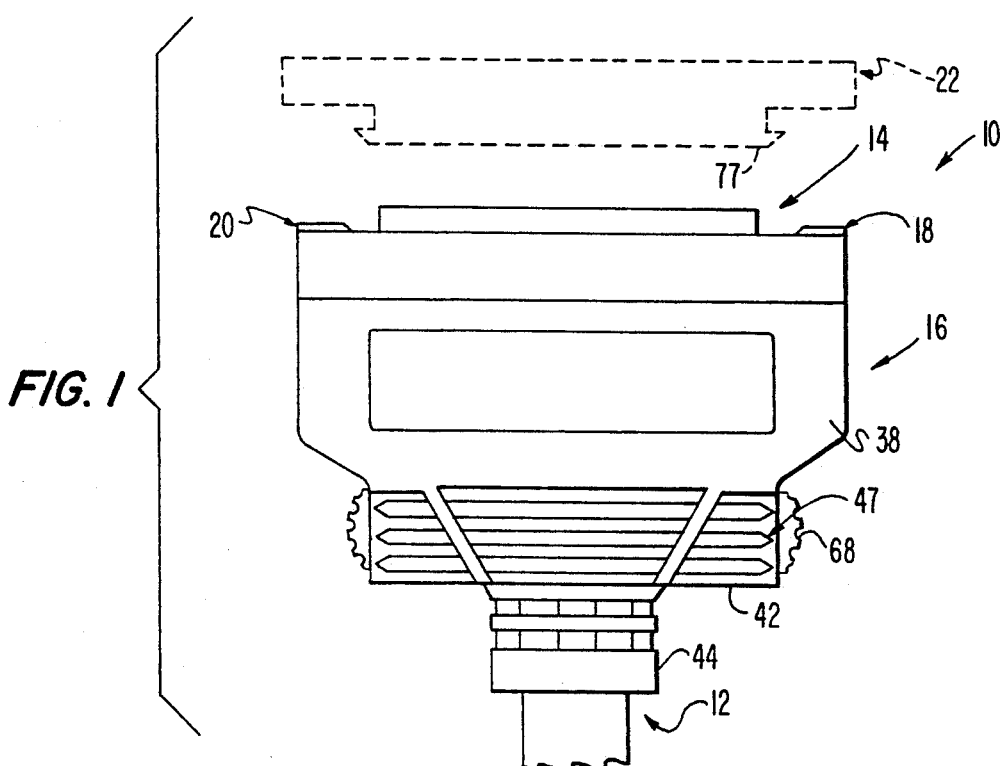
FIG. 1 is a top plan view of the cable, connector housing and outer housing in accordance with the invention with the connector housing about to be connected to a complementary connector housing.

As seen in FIGS. 1–4, the electrical connector 10 in accordance with the invention comprises an electrical cable 12 coupled to a connector housing 14, an outer tubular housing 16 coupled to the cable and housing, and a pair of latches 18 and 20 pivotally coupled to the outer housing 16. The electrical connector 10 receives a complementary connector housing 22, shown in phantom in FIGS. 1–3, for completing an electric circuit with latches 18 and 20 releasably locking the connector 10 and housing 22 together.

Figure 2:
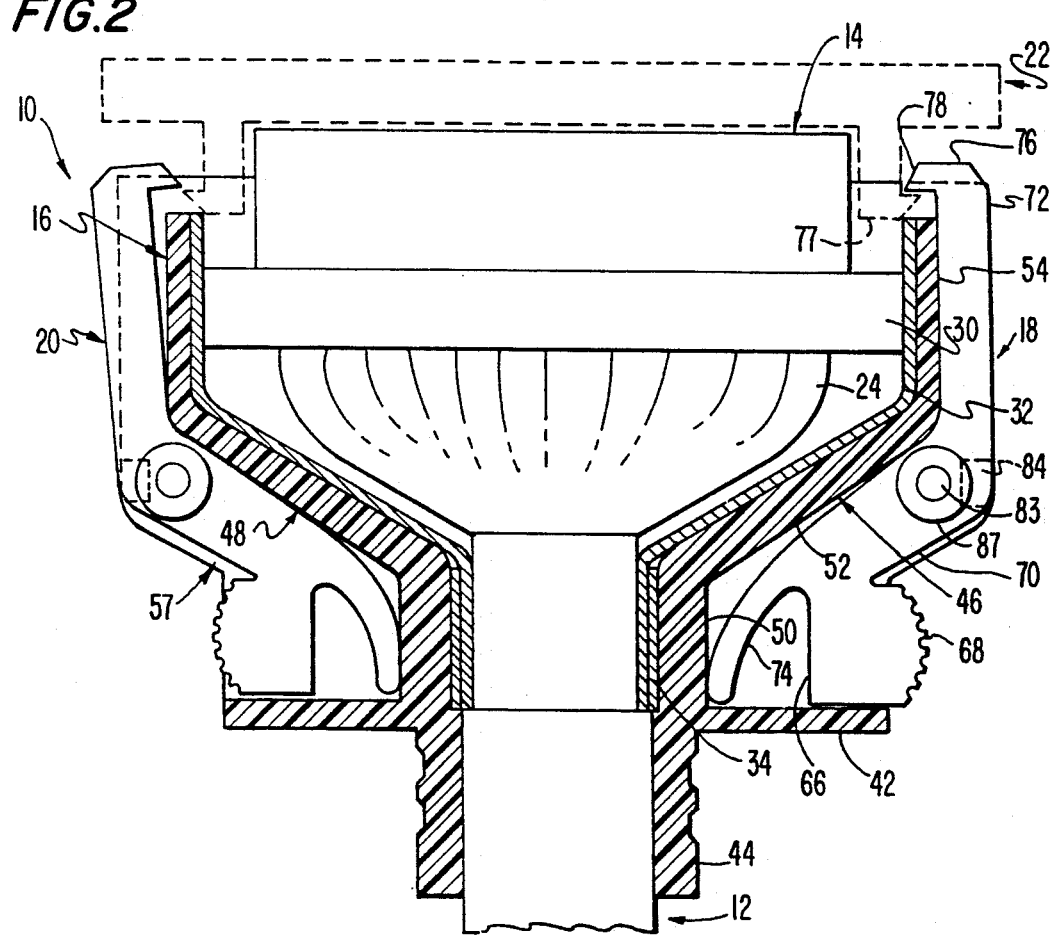
FIG. 2 is an enlarged top plan view of the cable, connector housing and housing in longitudinal section showing the latches in closed and open positions with the connector housing connected to a complementary connector housing.
Figure 3:
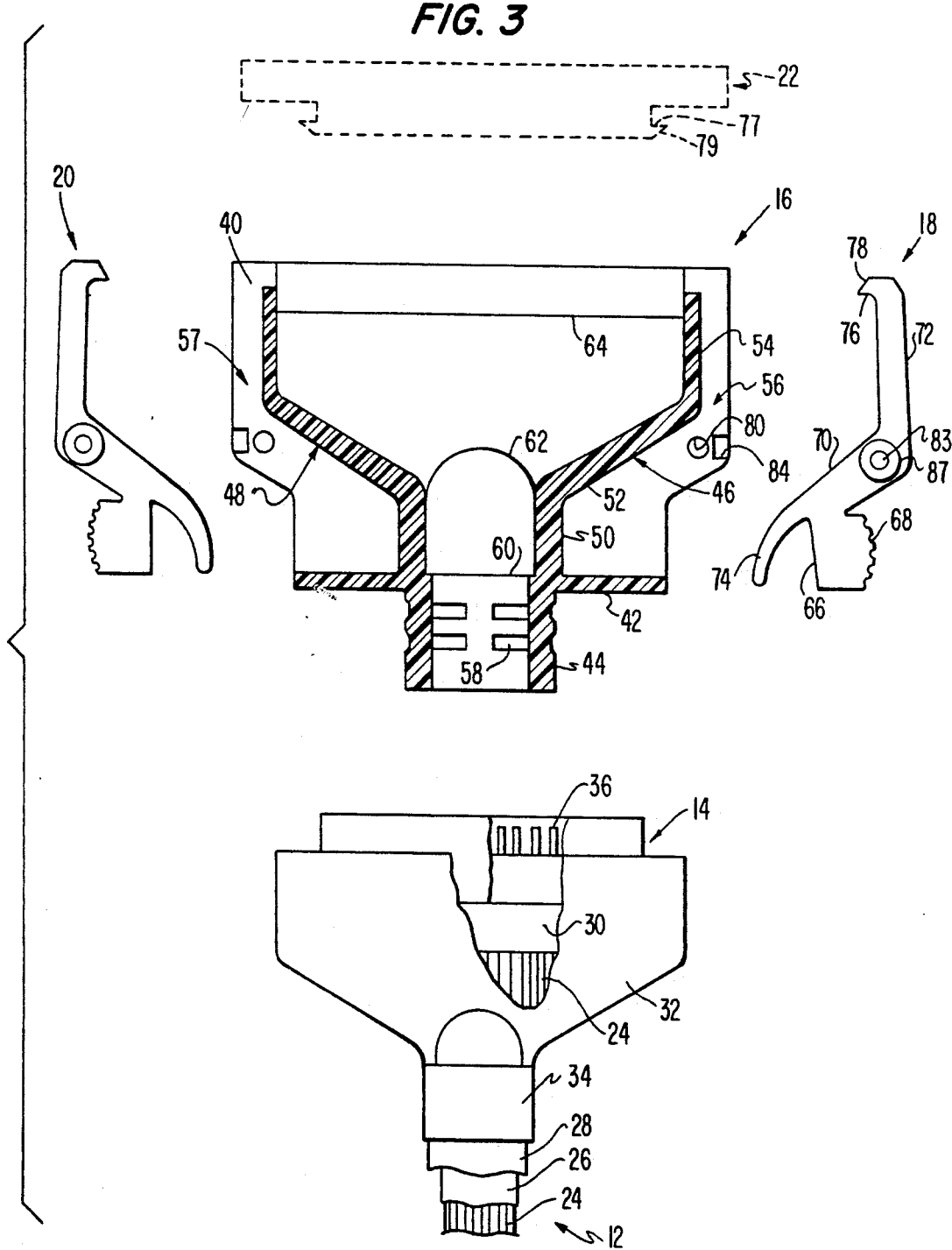
FIG. 3 is an exploded top plan view of the assembly shown in FIG. 2 including the various parts forming the cable and housing, with the cable assembly in partial longitudinal section, the outer housing in longitudinal section and the latches in plan.

Electrical connector 10, as best seen in FIGS. 2 and 3, comprises a coaxial cable 12 having a plurality of insulated conductors 24 encased by a shield layer 26 and covered by an insulated jacket 28, which is terminated by an insulating terminal block 30 coupled to the connector housing 14. This assembly can be covered by a tubular metal shield 32 which is electrically connected to the connector housing 14. The metal shield 32 is secured to the shield layer 26 of the cable 12 by an electrically conductive ferrule 34. This ferrule connection may be achieved by a crimp for mechanical strain relief and electrical conductivity. The joint may also be soldered or welded. The metal shield 32 is electrically connected to the connector housing 14 by welding, soldering, or a latch mechanism. This assembly provides a transition between the bound coaxial cable 12 and the individual conductor terminals 36 on the connector housing which connect to suitable mating terminals in complementary connector housing 22 to form an electrical circuit.

In accordance with the present invention, the above described cable 12, shield 32, ferrule 34 and connector housing 14 are enclosed by an outer tubular housing 16. The outer housing is formed of molded material, preferably thermoplastic, such as PVC, polyethylene, ABS, or glass filled polypropylene. The material is dependent on the size of the housing, environmental requirements for the cable, and the economies of the overall production. The housing 16 is molded over the cable, shield, ferrule and connector housing by a molding process such as injection molding. Alternatively, the housing may be preformed by molding in silhouette of the connector, slid over the cable, ferrule and metal shield, and secured by adhesive or other locking mechanisms. Both methods provide an electrical connector with a molded outer covering secured to the connector housing.

Figure 4:
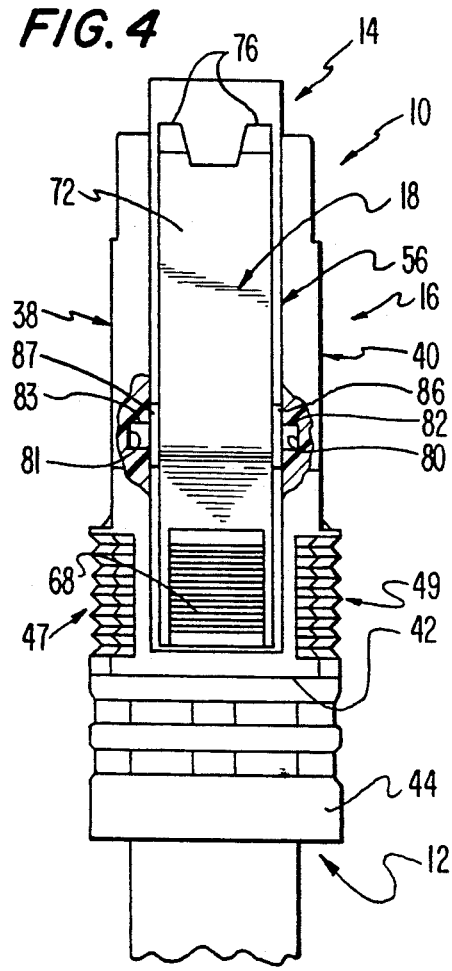
FIG. 4 is an enlarged side elevational view of the latches and housing shown in FIG. 2 showing the cable, outer housing, and latches retained in the outer housing.

In the embodiment shown in FIGS. 1-4, outer housing 16 comprises planar top and bottom walls 38 and 40 which are coextensive, a planar end wall 42 having an aperture and collar 44 for receiving the cable 12, and opposed substantially rigid side walls 46 and 48. The top and bottom walls may have gripping ridges 47 and 49 as shown in FIGS. 1 and 4.

Each side wall has a first planar portion 50 parallel to the longitudinal axis of the housing, a second planar portion 52 angled at substantially 30 degrees from the longitudinal axis, and a third planar portion 54 parallel to the longitudinal axis. The top and bottom walls protrude beyond each side wall, thus forming a cavity 56 which receives a latch 18 and a cavity 57 which receives a latch 20. The interior profile of the housing 16 between walls 46 and 48 follows the outer configuration of the cable 12 and shield 32. The collar 44 may be molded with interior grooves 58 to provide flexibility. To retain the ferrule 34, an interior shoulder 60 is used which provides strain relief to the cable when connected. The metal shield 32 is retained in the molded housing 16 by recess 62 and lip 64. These may be formed by molding directly onto the metal shield 32 assembly or by being premolded to closely fit the metal shield 32. As seen clearly in FIGS. 1 and 3, the housing 16 provides a simple planar exterior with an open end, while the interior conforms closely to the metal shield, ferrule and cable for a secure interlock.

The latches 18 and 20 are also formed of molded material which may be the same as the outer housing or may be conventional materials such as PVC, polypropylene, polyethylene, or ABS. The latches may comprise one type of plastic, a combination of two or more multi-cycle molded types of plastic, or a plastic overmolded metal core. In the embodiment illustrated in FIGS. 2 and 3, the latches 18 and 20 are the same. Thus, latch 18 comprises an elongate member having a first inner straight portion 66 with an outer curved pressing surface 68 which may be textured for ease of gripping, a second angled portion 70 which angles and flares away from the first portion at about 30°, a third outer straight portion 72, and a fourth curved biasing portion 74 extending integrally via a living hinge from the first portion 66. The third portion 72 has a pair of locking fingers 76 for interlocking a suitable locking finger 77 on complementary connector housing 22 in the electric circuit. The locking fingers 76 each have a camming surface 78 to allow a snap fit or sliding fit with a similar camming surface 79 on the complementary connector housing 22. The latch 18 is configured to fit within the cavity 56 and pivot. As shown in FIG. 2, the latch pivots within the cavity to disengage the complementary connector housing 22. The cavity 56 provides protection for the latch 18 from accidental breakage or damage. Preferably, each latch 18 and 20 is integrally formed as a one-piece member.

The means for pivoting latch 18, as seen in FIGS. 2-4, is provided by opposed, cylindrical recesses 80 and 81 in the top and bottom walls of housing 16 which communicate with the cavity 56 and pivotally receive cylindrical protrusions 82 and 83 on opposite sides of the second portion 70 of the latch. The protrusions are accepted into the recesses 80 and 81 by pressing them against opposed sliding ramps 84 for a snap fit engagement. Ramps 84 are formed in top and bottom walls 38 and 40 adjacent the recesses and bounded on the exterior by the outer edges of the top and bottom walls. One ramp is provided for each of the recesses. The protrusions, or rods, 82 and 83 are integrally formed with the latch and are coaxial and define a pivot axis about which the latch pivots, this pivot axis being substantially perpendicular to the planes of the top and bottom walls. As seen in FIG. 4, latch 18 has integral washers 86 and 87 surrounding protrusions 82 and 83 for strength and clearance for free pivotal movement once the latch is retained within the cavity. Latch 20 is similarly pivotally coupled to housing 16 in cavity 57. Pivotal coupling may also be provided by a pin assembly or an integrally molded hinge which will be described in accordance with the embodiment of FIG. 5.

The pivotal movement of latch 18 is restrained by the configuration of side wall 46 and resisted by biasing portion 74. The third portion 54 and the first portion 50 of the side wall 46 provide bearing surfaces for the latch 18 which limit the range of its movement. The first portion 50 of side wall 46 works in conjunction with and engages the fourth curved biasing portion 74 of latch 18 to provide a biasing surface to hold the latch in a locking position. When pressure is applied to surface 68 of the latch 18, the biasing portion 74 acts as a curved resilient leaf spring against the side wall portion 50 allowing the latch 18 to pivot and unlock the complementary connector housing 22. In the closed position, the biasing portion 74 has sufficient resiliency to hold the latch in a locked position. Latch 20 is similarly locked and unlocked. The closed, or locked, and open, or unlocked, positions of the latches 18 and 20 are shown in the right and left hand portions of FIG. 2, respectively.

FIG. 4 clearly illustrates the latch 18 pivotally received in the cavity 56. As seen in that figure, the cavity has a width slightly greater than the width of the latch and thus provides enough clearance for free pivotal movement of the latch. Each of the latches is substantially flush with the outer edges of the top and bottom walls, as seen in FIGS. 1 and 2. It is understood that alternative pivoting mechanisms, such as a pin assembly or integral hinge, would allow similar hinged movement of the latch as described above.

Figure 5:
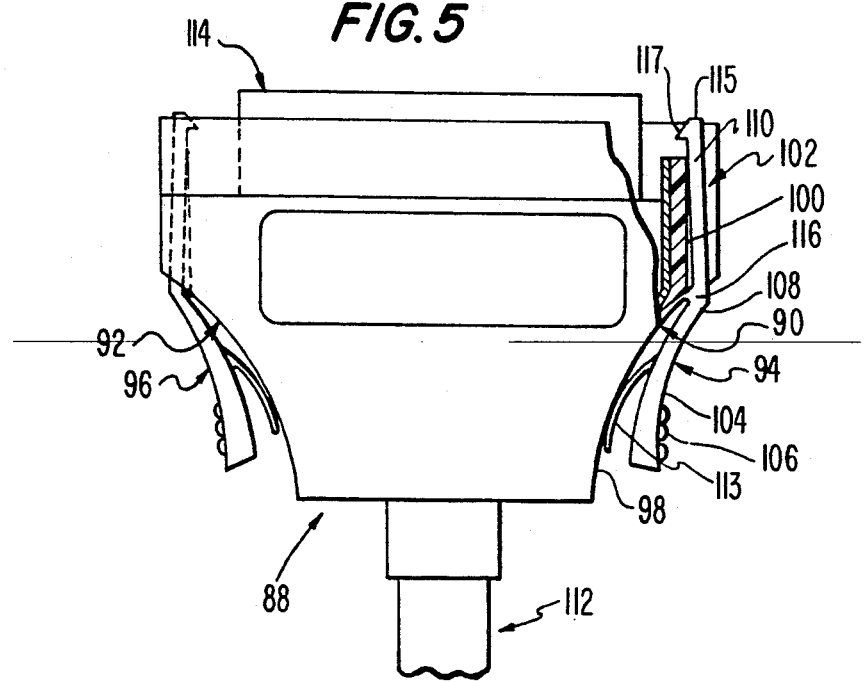
FIG. 5 is a top plan view in partial longitudinal section showing a slightly modified form of the outer housing and latches.

Embodiment of FIG. 5

FIG. 5 shows a modification of the housing and latches in accordance with the invention. FIG. 5 discloses a cable 112 coupled to a connector housing 114 and encased in a molded outer housing 88. The outer housing 88, similar to the housing 16 of the first embodiment, has planar top and bottom walls which are coextensive, an end wall having a collar extending therefrom for receiving cable 112, and side walls 90 and 92 for providing bearing surfaces for latches 94 and 96. Side wall 90 comprises a first arcuate portion 98 which extends away from the longitudinal axis of the housing and a planar portion 100 which is parallel to the longitudinal axis. A cavity 102 is formed by the top and bottom planar walls and the planar portion 100 of the side wall 90.

The latch 94 of the embodiment shown in FIG. 5 is integrally formed and comprises a first portion 104 having a pressing surface 106, a second angled and arcuate portion 108 extending from the first portion, a third straight portion 110 extending from the second portion, and a fourth arcuate biasing portion 113 which extends integrally via a living hinge from the first portion. Locking fingers 115 are carried by the third straight portion of the latch 94 and are configured with a camming surface 117 similar to the embodiment illustrated in FIG. 2. The latch 94 is pivoted by an integrally molded, or living, hinge 116 between side wall 90 and second portion 108 of the latch, which allows the latch to move from a closed position to an open position. Biasing portion 113 is a curved, resilient leaf spring which acts to resist unlocking of the latch by bearing against the arcuate side wall 98 of the housing 88. The integral hinge 116 allows the latch 94 to pivot in a manner similar to the recessed embodiment of FIG. 2. Latch 96 is similarly constructed and operated.

Embodiment of FIG. 6

FIG. 6 shows a modified latch assembly in accordance with the invention wherein latches 18' and 20' utilize a helical compression spring 75, rather than the integral leaf spring 74 shown in FIG. 2. The remaining structure in FIG. 6 is the same as that shown in FIG. 2 and discussed above, this structure bearing the same reference numerals.

The latch and housing assembly of FIG. 6 work in the same manner as the connector of FIG. 2. For example, latch 18' comprises an elongate member having a first inner straight portion 66' with an outer curved pressing surface 68' which may be textured for ease of gripping, a second angled portion 70 which angles and flares away from the first portion at about 30°, and a third outer straight portion 72'. Third portion 72' has a pair of locking fingers 76' for interlocking suitable locking fingers 77 on complementary connector housing 22 in the electric circuit. Locking fingers 76' each have a camming surface 78' to allow a snap-fit or sliding fit with a similar camming surface 79 on the complementary connector housing 22.

Latch 18' uses a separate helical compression spring 75 in place of the fourth curved biasing portion 74 discussed in reference to latch 18. Spring 75 is located between first inner portion 66' of latch 18' and first portion 50 of side wall 46. The right-hand portion of FIG. 6 illustrates latch 18' in a closed, locked position with spring 75 biasing first portion 66' away from housing side wall 46 and causing third portion 72' to bear against third planar portion 54 of side wall 48. The left-hand portion of FIG. 6 illustrates the open position of latch 20' in which helical spring 75 is compressed, thereby allowing latch 20' to pivot and release the locking fingers.

The use of a separate spring, such as helical spring 75, allows variation in the stiffness of the biasing means. Removal of latch 18' by snapping it out of cavity 56 and sliding protrusions 83' over ramp 84 allows spring 75 to be replaced or repaired. For example, if a secure interlock were desired in a system which was not disconnected often, an extremely stiff spring could be used. Alternatively, in a system in which connection and disconnection occurred frequently, a relatively loose spring could be used for easy operation.

The electrical connector according to this invention may be modified in size by adjusting the length and/or width to accommodate connectors within the range of, but not limited to, 20 to 120 positions.

As shown in FIGS. 1–6, the present invention relates to an electrical connector for an electrical cable which transmits power, data, signals, or voice. However, the invention broadly encompasses a connector for any type of cable used for energy transmission such as a fiber optic cable, an electrical cable, or a combination of both fiber optic and electrical conductors in a cable or cables.

While advantageous embodiments have been chosen to illustrate the invention, it will be understood by those skilled in the art that various changes and modifications can be made therein without departing from the scope of the invention as defined in the appended claims.

What is claimed is:

1. A connector, the combination comprising:
   an energy transmission cable having a connector housing coupled thereto;
   an outer unitary housing enclosing said connector housing and coupled to said energy transmission cable;
   a pair of latches;
   first means, coupled to said latches and said outer housing, for pivotally coupling said latches to said outer housing between open and closed positions and comprising a snap-fit connection; and
   second means, coupled to said latches and said outer housing, for resisting movement of said latches from said closed to said open positions,
   said first means being spaced from said second means,
   said outer unitary housing having a longitudinal axis and a pair of cavities, each of said cavities being laterally-facing and outwardly-opening, and adapted to receive one of said latches therein upon sliding said latch in the lateral direction substantially perpendicular to said longitudinal axis.

2. A connector according to claim 1, wherein said outer housing comprises molded thermoplastic material.

3. A connector according to claim 1, wherein said second means comprises a first leaf spring integrally formed with said first latch and a second leaf spring integrally formed with said second latch.

4. A connector according to claim , wherein each of said latches comprises thermoplastic material.

5. A connector according to claim 1, wherein each of said latches has a pair of coaxial protrusions extending from opposite sides thereof.

6. A connector according to claim 1, wherein said first means comprises two pair of recesses in said outer housing, and a pair of protrusions on each of said latches, each of said recesses pivotally receiving one of said protrusions.

7. A connector according to claim 1, wherein said second means comprises a resilient leaf spring coupled to each of said latches, and a substantially rigid wall mounted on said outer housing, each of said springs being biased against one of said walls.

8. A connector according to claim 1, wherein said second means comprises a separate biasing mechanism.

9. A connector according to claim 1, wherein each of said latches has two ends, one of said ends having a locking finger and the other of said ends having a pressing portion, and said second means comprises a helical compression spring located between said outer housing and said pressing portion.

10. A connector according to claim 1, and further comprising a shield connected to said connector housing and connected to said cable.

11. A connector according to claim 10, wherein said outer housing is integrally molded around said shield.

12. A connector according to claim 1, wherein said outer housing is tubular and comprises a planar top wall having outer edges;

a planar bottom wall having outer edges;

a planar end wall having an aperture; and a pair of side walls joining said top and bottom walls, said longitudinal axis being parallel to said top and bottom walls, and each of said cavities being formed by a portion of one said side walls and said top and bottom walls.

13. A connector according to claim 12, wherein said top and bottom walls are coextensive.

14. A connector according to claim 12, wherein each of said side walls comprises a first planar portion parallel to said longitudinal axis;

a second planar portion angled substantially 30 degrees from said longitudinal axis; and a third planar portion parallel to said longitudinal axis.

15. A connector according to claim 14, wherein each of said cavities is formed by one of said third planar portions of said side walls and said top and bottom walls.

16. A connector according to claim 12, wherein said top and bottom walls extend beyond each of said side walls forming said cavities.

17. A connector according to claim 16, wherein each of said latches is received in one of said cavities and at least a portion of each of said latches is substantially flush with said top and bottom wall outer edges.

18. A connector according to claim 12, wherein each of said top and bottom walls has an outer edge, and a recess spaced from said outer edge, communicating with each of said cavities.

19. A connector according to claim 18, wherein each of said top and bottom walls has a ramp located between said outer edge and said recess for sliding said latch into and out of said cavities, said ramps on said top wall inclining inwardly and downwardly from said outer edge of said top wall toward said longitudinal axis, and said ramps on said bottom wall inclining inwardly and upwardly from said outer edge of said top wall toward said longitudinal axis.

20. A connector according to claim 1, wherein each of said latches has a first portion;

a second portion extending from said first portion;

a third straight portion extending from said second portion; and a fourth curved resilient portion extending from said first portion and biasing said first portion away from said side wall.

21. A connector according to claim 20, wherein each of said third portions of said latches abuts one of said side walls in a locking position.

22. A connector according to claim 20, wherein each of said third straight portions has at least one locking finger.

23. A connector according to claim 22, wherein each of said fingers has a camming surface.

24. A connector according to claim 1, wherein each of said latches has a first portion spaced from said outer housing;

a second portion extending from said first portion; and a third straight portion extending from said second portion and having at least one locking finger.

25. A connector according to claim 24, wherein said second means comprises a helical compression spring compressed between said outer housing and said first portion of each of said latches.

26. A connector, the combination comprising:

an energy transmission cable having a connector housing coupled thereto;

an outer unitary housing having a pair of cavities and enclosing said connector housing and said cable;

a pair of elongate latches, each pivotally coupled to said outer housing in one of said cavities about a pivot axis having a first and a second side, each of said latches having at least one locking finger spaced from and located on said first side of said pivot axis, and a resilient spring spaced from and located on said second side of said pivot axis for biasing each of said fingers towards said outer housing; and coupling means for pivotally coupling each of said latches to said housing and comprising a snap-fit connection, and said pair of cavities being laterally-facing and outwardly-opening, and adapted to receive one of said latches therein upon sliding said latch in the lateral direction substantially perpendicular to said longitudinal axis.

27. A connector according to claim 26, wherein said outer housing and said pair of latches are molded thermoplastic.

28. A connector according to claim 26, wherein each of said resilient springs are integrally formed with one of said latches.

29. A connector according to claim 26, wherein each of said at least one locking fingers has a camming surface.

30. A connector according to claim 26, wherein said coupling means comprises a pair of protrusions on each of said latches, and a plurality of recesses in said outer housing, each of said recesses pivotally receiving one of said protrusions therein.

31. A connector according to claim 26, wherein each of said resilient springs is a helical spring, each spring being located within one of said cavities.

32. A connector, the combination comprising:
an energy transmission cable having a connector housing coupled thereto;
an outer unitary housing enclosing said connector housing and coupled to said energy transmission cable;
a pair of latches;
first means, coupled to said latches and said outer housing, for pivotally coupling said latches to said outer housing between open and closed positions, said first means comprising a molded integral connection between said outer housing and each of said latches; and
second means, coupled to said latches and said outer housing, for resisting movement of said latches from said closed to said open positions,
said first means being spaced from said second means,
said outer unitary housing having a longitudinal axis and a pair of cavities, each of said cavities being laterally-facing and outwardly-opening, and adapted to hold one of said latches therein.

33. A connector according to claim 32, wherein each of said latches is integrally molded with said outer housing.

34. A connector according to claim 32, wherein said second means comprises a resilient leaf spring coupled to each of said latches, and
a substantially rigid wall mounted on said outer housing, each of said springs being biased against one of said walls.

35. A connector according to claim 32, wherein each of said latches has
a first portion;
a second portion extending from said first portion;
a third straight portion extending from said second portion and having at least one locking finger; and
a fourth curved resilient portion extending from said first portion and biasing said first portion away from said side wall.

36. A connector according to claim 32, wherein said outer housing is tubular and comprises
a planar top wall h having outer edges;
a planar bottom wall having outer edges;
a planar end wall having an aperture; and
a pair of side walls joining said top and bottom walls,
said longitudinal axis being parallel to said top and bottom walls, and
said pair of cavities being formed by a portion of one said side walls and said top and bottom walls.

37. A connector according to claim 36, wherein each of said side walls comprises
a first arcuate portion extending from said planar end wall away from said longitudinal axis; and
a second planar portion parallel to said longitudinal axis.

* * * * *